(No Model.)
R. NETTELL.
DRILL RELEASING TOOL.
No. 575,267. Patented Jan. 12, 1897.
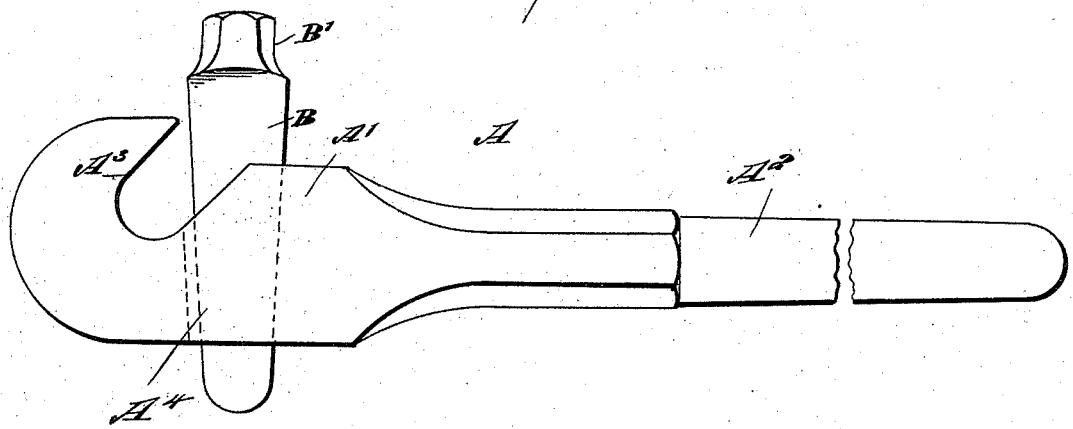
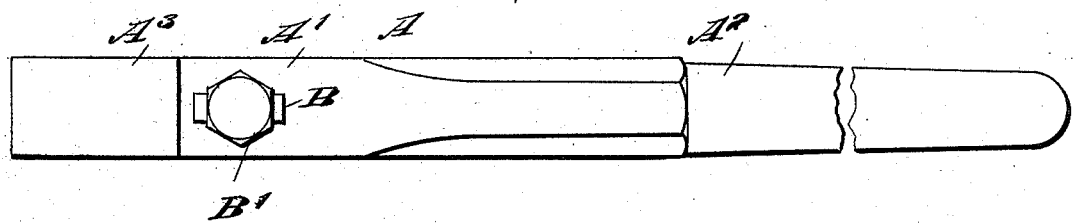
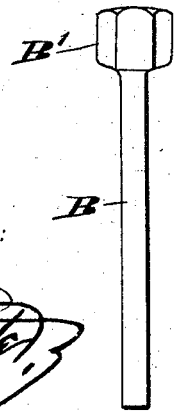
WITNESSES:
H. Walker
INVENTOR
R. Nettell.
BY
ATTORNEYS.

UNITED STATES PATENT OFFICE.

RICHARD NETTELL, OF CALUMET, MICHIGAN.

DRILL-RELEASING TOOL.

SPECIFICATION forming part of Letters Patent No. 575,267, dated January 12, 1897.

Application filed September 24, 1896. Serial No. 606,806. (No model.)

*To all whom it may concern:*

Be it known that I, RICHARD NETTELL, of Calumet, in the county of Houghton and State of Michigan, have invented a new and Improved Drill-Releasing Tool, of which the following is a full, clear, and exact description.

The invention relates to drilling-machines actuated by compressed air, steam, or other means; and its object is to provide a new and improved releasing-tool which is simple and durable in construction and arranged to permit the operator to quickly and readily release and loosen the drill in case the latter becomes stuck in the work.

The invention consists principally of a body formed with a hook adapted to engage the drill-shank and a locking device held on the said body and adapted to engage the said shank and lock the latter in place in said hook.

The invention also consists of certain parts and details and combinations of the same, as will be fully described hereinafter, and then pointed out in the claims.

Reference is to be had to the accompanying drawings, forming a part of this specification, in which similar characters of reference indicate corresponding parts in all the figures.

Figure 1 is a plan view of the improvement. Fig. 2 is a side elevation of the same. Fig. 3 is an edge view of the wedge or key, and Fig. 4 is a face view of the same.

The improved releasing-tool is provided with a wrench A, having a body A', from which extends a handle $A^2$, and on which is formed a hook $A^3$, adapted to engage the shank of the drill. The opening of the hook is angular to the side of the body A', as is plainly illustrated in Fig. 1, and a wedge or key B is adapted to be driven into an opening $A^4$, formed transversely in the body A' next to the hook $A^3$, so as to bind or clamp the drill-shank in place in the hook $A^3$. The key or wedge B is formed with a head B', adapted to be struck by a hammer or other tool to securely drive the said wedge in contact with the side of the shank.

It is evident that when the releasing-tool engages the shank of the drill and the shank is fastened in position by driving in the wedge, then the operator by manipulating the handle $A^2$ can readily release the drill, if stuck fast in the work, either by turning the handle or lifting thereon, as the case may be.

Having thus described my invention, I claim as new and desire to secure by Letters Patent—

1. A drill-releasing tool, comprising a body formed with a hook adapted to engage a drill-shank, and a locking device held on the said body and adapted to engage the said shank and lock the latter in place in the hook, substantially as shown and described.

2. A drill-releasing tool, comprising a body formed with a transverse opening, a hook next to the said opening, and a key or wedge adapted to be driven into the said transverse opening, to engage the drill-shank and lock the same in the said hook, as set forth.

3. A drill-releasing tool, comprising a body having a hook at one end the opening of which is angular to the side of the body and provided with a transverse opening adjacent to the hook and in a plane parallel therewith, and a key or wedge in the said opening and extending partly across the opening of the hook, substantially as herein shown and described.

RICHARD NETTELL.

Witnesses:
GEO. H. BOTTOMLEY,
GEO. LUKEY.